United States Patent
Gao

(10) Patent No.: US 10,308,314 B2
(45) Date of Patent: Jun. 4, 2019

(54) CENTRAL SHAFT TORQUE SENSING FOR ELECTRIC BICYCLE HAVING CENTRE-MOUNTED MOTOR

(71) Applicant: TAICANG YUEBO ELECTRIC TECHNOLOGY CO., LTD., Taicang, Jiangsu (CN)

(72) Inventor: Feng Gao, Taicang (CN)

(73) Assignee: TAICANG YUEBO ELECTRIC TECHNOLOGY CO., LTD., Taicang Jiangsu (CN)

( * ) Notice: Subject to any disclaimer, the term of this patent is extended or adjusted under 35 U.S.C. 154(b) by 67 days.

(21) Appl. No.: 15/522,925

(22) PCT Filed: Dec. 19, 2014

(86) PCT No.: PCT/CN2014/001147
§ 371 (c)(1),
(2) Date: Apr. 28, 2017

(87) PCT Pub. No.: WO2016/065501
PCT Pub. Date: May 6, 2016

(65) Prior Publication Data
US 2017/0313379 A1    Nov. 2, 2017

(30) Foreign Application Priority Data
Oct. 31, 2014    (CN) .......................... 2014 1 0605169

(51) Int. Cl.
*B62M 6/50*        (2010.01)
*B62M 6/65*        (2010.01)
(Continued)

(52) U.S. Cl.
CPC .............. *B62M 6/50* (2013.01); *B62M 6/55* (2013.01); *B62M 6/65* (2013.01); *B62M 11/145* (2013.01);
(Continued)

(58) Field of Classification Search
CPC ........ B62M 6/50; B62M 11/145; B62M 6/55; B62M 6/65; B62M 11/16; G01L 3/108; G01L 5/225
See application file for complete search history.

(56) References Cited

U.S. PATENT DOCUMENTS

| 2007/0129207 A1* | 6/2007 | Kanamori .............. G01L 3/108 |
| | | 475/331 |
| 2012/0186892 A1* | 7/2012 | Felsl ........................ B62M 1/14 |
| | | 180/220 |
| 2016/0107720 A1* | 4/2016 | Xu .......................... B62M 6/50 |
| | | 475/4 |

FOREIGN PATENT DOCUMENTS

| CN | 102514679 A | 6/2012 |
| CN | 202379046 U | 8/2012 |
| (Continued) |

OTHER PUBLICATIONS

International Search Report for PCT/CN2014/001147 dated Jun. 23, 2015 [PCT/ISA/210].

*Primary Examiner* — David J Hlavka
(74) *Attorney, Agent, or Firm* — Sughrue Mion, PLLC

(57) ABSTRACT

A central shaft torque sensing system for an electric bicycle having a center-mounted motor. The system comprises a central shaft, a center-mounted motor and a controller, and also comprises a torque sensor and a strain sleeve. The controller is respectively connected to the torque sensor and the center-mounted motor, and the motor comprises a main housing, a coil stator, a rotor, a motor output gear shaft, a planetary reduction mechanism and a dual-ratchet clutch, one end of the strain sleeve being connected to the dual-ratchet clutch, the other end being sleeved on the central shaft and fixedly connected thereto, the torque sensor being mounted on the sleeve. The motor output gear shaft is sleeved on the central shaft and forms an integrated structure (Continued)

with the rotor of the motor, the coil stator is fixed on the main housing, the rotor is wrapped on the outside of the coil stator and fixedly connected to the motor output gear shaft, the planetary reduction mechanism is arranged within the main housing, and the gear shaft engages with the planetary reduction mechanism via a gear. The present motor driving system provides corresponding assistance according to the specific requirements of a rider.

10 Claims, 3 Drawing Sheets

(51) Int. Cl.
  *B62M 11/16* (2006.01)
  *G01L 3/10* (2006.01)
  *G01L 5/22* (2006.01)
  *B62M 6/55* (2010.01)
  *B62M 11/14* (2006.01)
(52) U.S. Cl.
  CPC .............. *B62M 11/16* (2013.01); *G01L 3/108* (2013.01); *G01L 5/225* (2013.01)

(56) References Cited

FOREIGN PATENT DOCUMENTS

| | | |
|---|---|---|
| CN | 103661762 A | 3/2014 |
| CN | 104276250 A | 1/2015 |
| JP | 2011-68278 A | 4/2011 |

* cited by examiner

Teeth of the spline
Cross-section of
the central shaft

Key slots of the
spline
Inner section of
the fluted discs
bracket

CENTRAL SHAFT TORQUE SENSING FOR ELECTRIC BICYCLE HAVING CENTRE-MOUNTED MOTOR

CROSS REFERNCE TO RELATED APPLICATIONS

This application is a National Stage of International Application No. PCT/CN2014/001147, filed on Dec. 19, 2014, which claims priority from Chinese Patent Application No. 201410605169.X, filed on Oct. 31, 2014, the contents of all of which are incorporated herein by reference in their entirety.

TECHNICAL FIELD

The present invention relates to a sensing system for the central shaft torque, and particularly to a central shaft torque sensing system for an electric bicycle having a centre-mounted motor.

BACKGROUND

Currently, there has been developed a central shaft torque sensing system that is used for an electric bicycle, including a motor and a controller, the controller is disposed at the outside of the motor and controls the motor to output a constant power to provide assistance for manpower trample. This motor driving system cannot provide corresponding assistance based on the specific requirements of a rider.

Against this background, people urgently need a central shaft torque sensing system that is used for an electric bicycle having a centre-mounted motor, wherein a torque sensor signals to the controller by a signal transmitter, and what is reflected by the torque sensor is an actual pedal situation; meanwhile, a motor driving system provides corresponding assistance according to the specific requirements of a rider.

SUMMARY OF THE INVENTION

In order to solve the above-mentioned technical problems, the object of the present invention is to provide a central shaft torque sensing system for an electric bicycle having a centre-mounted motor, one end of a strain sleeve in the electric bicycle is connected to a sprocket bracket and the other end of the strain sleeve is fixedly connected with a central shaft, a pedal force is directly transmitted to the strain sleeve by the central shaft, then a signal is produced by a torque sensor which is on the surface of the strain sleeve and is transmitted to a controller to control an output of the motor. What is reflected by the torque sensor is an actual pedal situation; meanwhile, a motor driving system provides corresponding assistance according to the specific requirements of a rider.

In order to realize the above-mentioned object of the invention, a technical solution provided by the present invention is:

A central shaft torque sensing system for an electric bicycle having a centre-mounted motor comprises a central shaft, a centre-mounted motor and a controller, and also comprises a torque sensor and a strain sleeve, wherein:

the controller is connected to the torque sensor and the centre-mounted motor, respectively, the motor comprises a main housing, a coil stator, a rotor, a motor output gear shaft, a planetary reduction mechanism and a dual-ratchet clutch, one end of the strain sleeve is connected to the dual-ratchet clutch, the other end of the strain sleeve is sleeved on the central shaft and fixedly connected thereto, the torque sensor being mounted on the sleeve;

the motor output gear shaft is sleeved on the central shaft and forms an integrated structure with the rotor of the motor, the coil stator is fixed on the main housing, the rotor wraps around the outer side of the coil stator and fixedly connected to the motor output gear shaft, the planetary reduction mechanism is arranged within the main housing, and the motor output gear shaft engages with the planetary reduction mechanism via a gear.

Furthermore, the dual-ratchet clutch is formed by means of two ratchet wheels which have the opposite stopping directions superposing axially, and is composed of an inner ring, a middle ring and an outer ring, the middle ring is fixedly connected with a sprocket bracket of the electric bicycle, the inner ring is connected to the strain sleeve or the central shaft, and the outer ring is connected to an output end of the planetary reduction mechanism.

Furthermore, a magnetic steel part is inserted into the rotor.

Furthermore, an inner surface of the strain sleeve fits with an outer surface of the central shaft.

Furthermore, the torque sensor connects a signal transmitter for transmitting a torsion signal to the controller.

Furthermore, a part of the inner ring of the dual-ratchet clutch is connected with the sleeve via a first spline of which the teeth and key slots present a torque travel clearance fit, the other part of the inner ring slides on the central shaft.

Furthermore, a part of the inner ring of the dual-ratchet clutch is connected with the sleeve via a first spline, the other part of the inner ring is connected with the central shaft via a second spline, the teeth and key slots of the second spline present a torque travel clearance fit.

Employing above-mentioned technical solution, the beneficial effects of the present invention are:

1. According to the centre-mounted motor driving system provided by the present invention, the sensor detects the torsion of the sleeve and transmits the detected signal to the controller, and then, the controller adjusts the motor output according to the detected signal to provide corresponding assistance for manpower trample, which is more aligned with the requirements of a rider.

2. Employing the design of the present invention, the current widespread phenomenon of unbalanced left/right foot detection during measurement by a torque sensing system is prevented, measured radial torque accurately reflects the pedalling force, and a sprocket bracket is driven via the strain sleeve whether the left foot or the right foot is pedalling, thereby ensuring smooth riding and increasing riding comfort.

3. Because the strain sleeve and the central shaft sleeved therein are in a sliding fit and there exists a certain fit clearance between them, even if an abnormal situation occurs, such as someone trample at the pedal when a bicycle is parked, at this point the central shaft will produce a slight leverage deformation and the deformation are attenuated sharply after transmitted to the strain sleeve by a fit clearance, while taking into consideration of the strong rigidity of the central shaft and the very small amount of deformation itself, at this point a torque detected by the strain sleeve is much less than the torque during the normal trample, so the electric bicycle will not start outputting a motor actuation force and will not start an error action. Therefore, the system overcomes the common defects of the current central shaft torque sensing system.

LIST OF REFERENCE NUMBERS

1 central shaft; 2 bearing; 3 rotor portion of conductive slip ring; 4 stator portion of conductive slip ring; 5 Hall sensor; 6 magnet ring; 7 torque sensor; 8 strain sleeve; 9 bearing; 10 sprocket bracket; 11 left end cover; 12 left interlayer; 13 motor controller; 14 conductive slip ring; 15 magnification circuit plate; 17 stator coil; 18 magnetic steel part; 19 gear shaft; 20 dual-ratchet clutch; 21 right end cover; 22 planetary reduction mechanism; 23 motor main housing; 24 motor rotor; 25 first spline; 26 second spline; 27 torque travel clearance; 28 mandrel; 29 fluted discs bracket.

DETAILED DESCRIPTION

Figure 1:
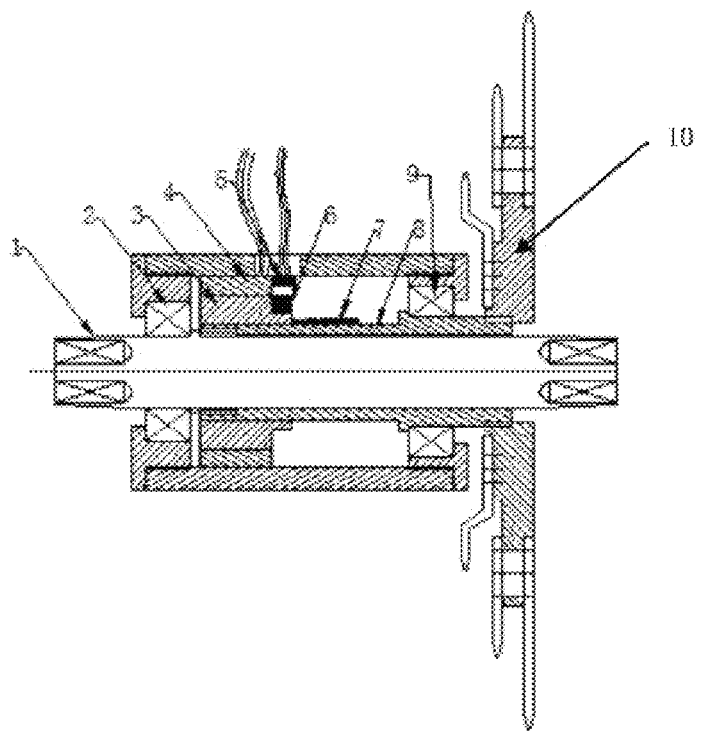
FIG. 1 is a schematic diagram of a structure of a central shaft torque sensing system of one embodiment of the present invention.
Figure 5:
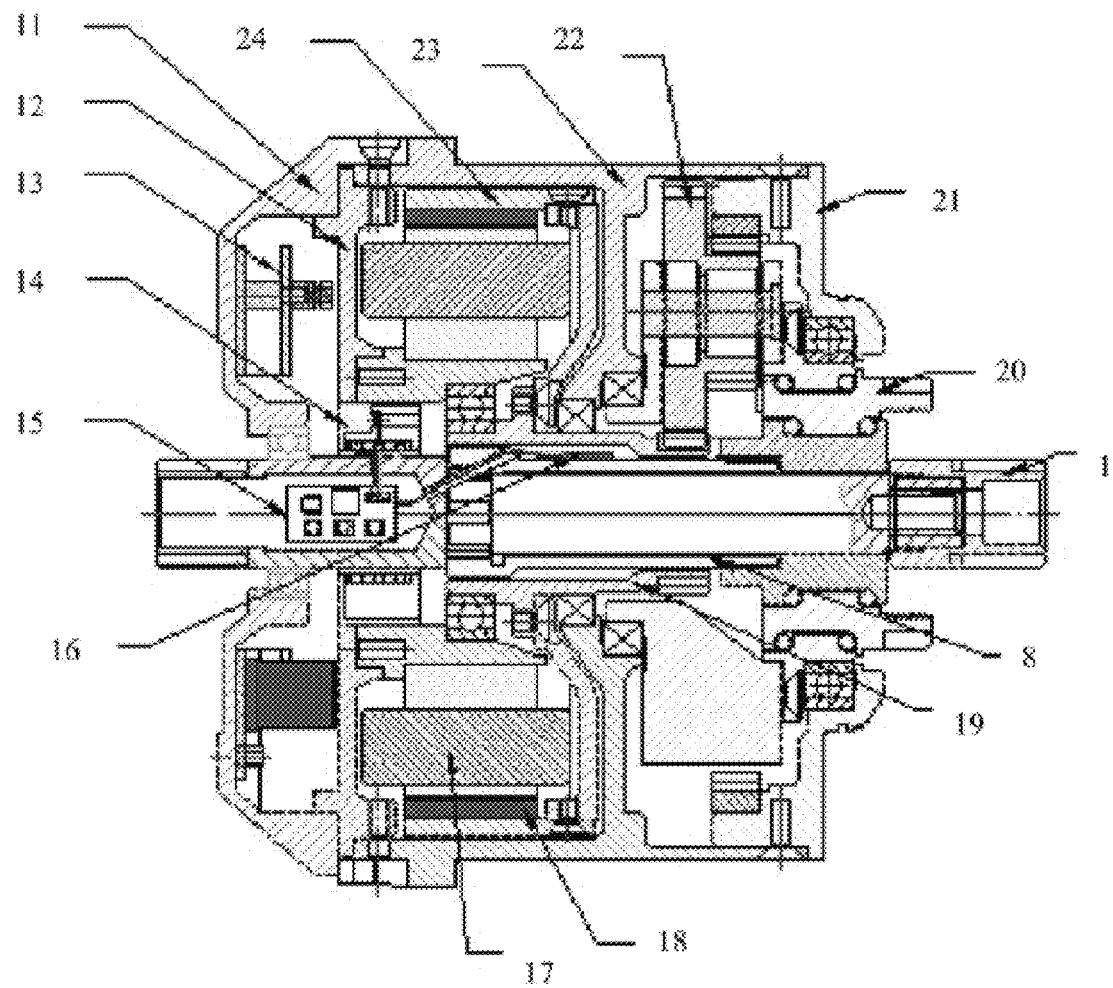
FIG. 5 is a cross-section diagram of a centre-mounted motor torque driving system of one embodiment of the present invention.

With reference to FIGS. 1 and 5, a central shaft torque sensing system for an electric bicycle having a centre-mounted motor is provided by the present invention, which comprises a central shaft 1, a strain sleeve 8, a sprocket bracket 10, a torque sensor 7 and a five-way piece, one end of the strain sleeve 8 is fixed on the five-way piece via a bearing 2 and is connected to the sprocket bracket 10, the other end of the strain sleeve 8 is sleeved on the central shaft 1 and is fixedly connected with the central shaft, an inner surface of the strain sleeve fits with an outer surface of the central shaft, the sleeve and the central shaft can only turns slightly therebetween, and will not shake up, down, left and right. When a foot tramples a pedal, regardless of whether is a left foot or a right foot, all the occurred pedalling forces are transmitted to the strain sleeve 8 through a junction between the central shaft and the sleeve, the pedalling forces are transferred out by the other end of the sleeve via the sprocket bracket 10 to control a rotation of a wheel. The torque sensor 7 is adhered to an outer surface of the strain sleeve, the torque sensor connects a signal transmitter to transmit a torsion signal to a controller. The signal transmitter may be contact sensor, such as conductive slip ring shown in FIG. 1, and may also be non-contact sensor, such as a loosely coupled transformer, wireless transmission system. The sleeve is subjected to a rotation torsion to take place a slight torsional deformation during this process, causing the torque sensor to take place a deformation and to produce a pedal torque signal, which is transmitted to the controller for controlling an operation of the motor after the controller makes a calculation via a program according to the magnitude of the torsion signal. Therefore, a better riding experience can be obtained.

The motor of the present invention is a concentric and coaxial motor, as shown in FIG. 5, including a motor main housing 23, a stator coil 17, a motor rotor 24, a central shaft 1, a gear shaft 19, and a dual-ratchet clutch 20, a magnetic steel part 18 is inserted into the motor rotor 24, a motor output gear shaft 19 is sleeved on the central shaft, a gear shaft formed an integrated structure with the motor rotor 24 is sleeved on the central shaft 1 and engages with a planetary reduction mechanism. The dual-ratchet clutch 20 is formed by means of two ratchet wheels which have the opposite stopping directions superposing axially, and is composed of an inner ring, a middle ring and an a outer ring, the middle ring is fixedly connected with the sprocket bracket 10 to actuate the electric bicycle to move forward; the inner ring is connected to the strain sleeve or the central shaft of the electric bicycle, and is an output component of the pedalling force; the outer ring is connected to an output end of the planetary reduction mechanism 22 and is connected with a right end cover 21 by a bearing, to function as a power output component of the motor.

The controller controls the stator coil to energize and de-energize as well as the obtained quantity of electricity. When the stator coil is energized, the rotor rotates and drives the gear shaft 19 to rotate, making a reduction gearbox output rotation proportionally by means of an engagement relationship between the gear shaft and the planetary reduction mechanism. If the sleeve or the central shaft rotates in forward direction, the dual-ratchet clutch 20 drives the sprocket bracket to rotate positively. Meanwhile, the controller controls the obtained quantity of electricity of the stator coil according to a signal detected by the sensor, and then controls the dual-ratchet clutch 20 to drive the sprocket bracket to rotate positively. That is to say, when the pedalling speed is faster, the central shaft acts as the driving component of the sprocket wheel bracket, and when the speed output by the motor is faster, the motor acts as the driving component of the sprocket bracket.

Figure 2:
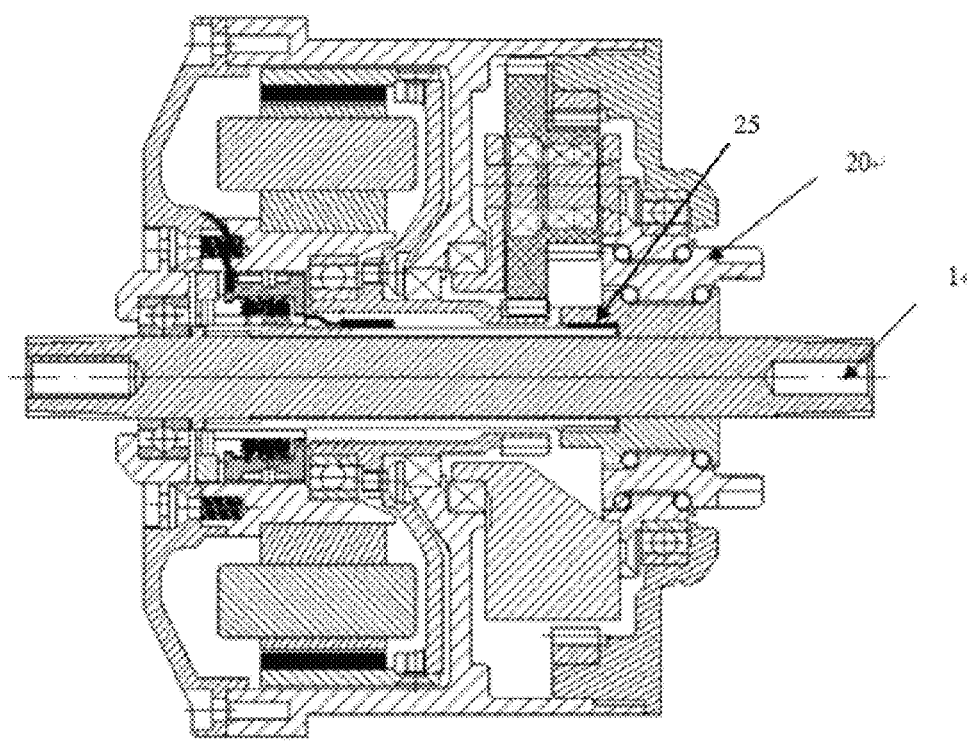
FIG. 2 is a schematic diagram of a structure of a one-stage spline in another embodiment in the present invention.
Figure 3:
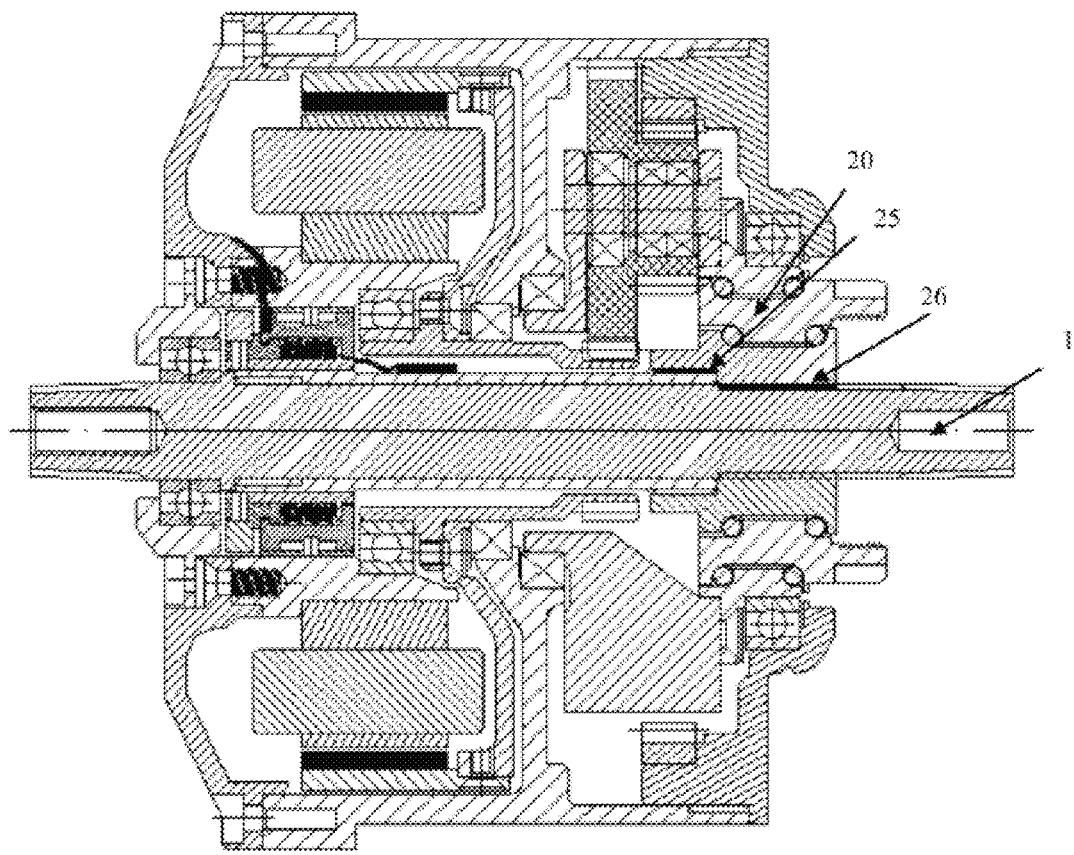
FIG. 3 is a schematic diagram of a structure of a two-stage spline in another embodiment in the present invention.
Figure 4:
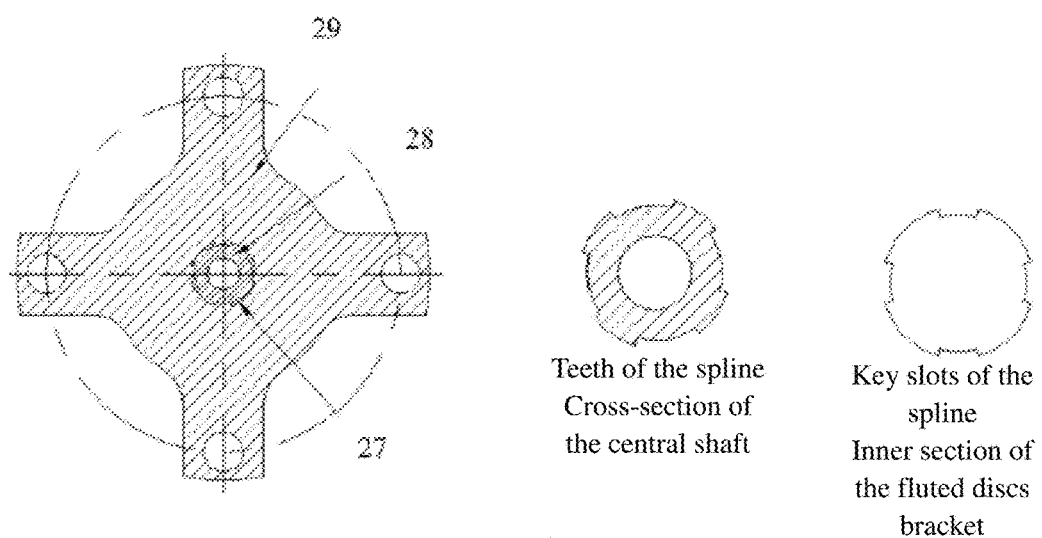
FIG. 4 is a schematic diagram of a structure of a spline in another embodiment in the present invention.

In one embodiment of the present invention, as shown in FIGS. 2-4, a structure of a one-stage spline is shown in FIG. 2, wherein a part of the inner ring is connected with the sleeve via a first spline 25, the teeth and key slots of the spline present a torque travel clearance fit, the other part of the inner ring slides on the central shaft. A torque on the sleeve is transmitted to an inner ring of the dual-ratchet clutch 20 by the first spline. A structure of a two-stage spline is shown in FIG. 3, a part of the inner ring is connected with the sleeve via the first spline 25, the other part of the inner ring is connected with the central shaft via a second spline 26, as shown in FIG. 4, the teeth and key slots of the spline present a torque travel clearance 27 fit. After the pedalling force exceeds an upper limit, the central shaft transmits the pedalling force to the inner ring of the dual-ratchet clutch by the second spline 26, the strain sleeve 8 no longer continues to deform, thereby achieving an effect of prolonging the service life of the sleeve.

As shown in FIG. 3, when a foot normally exert itself to trample a pedal, the torsion on the sleeve is transmitted to the inner ring via the first spline 25. Because it is a normal pedalling force, a torsional deformation of the sleeve relative to the central shaft is within a certain range, the teeth and key slots of the second spline 26 still move within the torque travel clearance and the transmission effect do not take place. This process is the normal work process of the electric bicycle.

When the pedal force persistently increase, the deformation of the sleeve is not enough in the normal use, the central shaft begin to directly transmit the pedal force via the second spline 26 which acts as a direct transmission path of the pedalling force, a torsion exceeding the designed amount of deformation of the sleeve is directly interrupted, an excessive pedal force on the central shaft is directly transmitted to the inner ring by the central shaft via the second spline. This avoids the sleeve being damaged when encountering a violent trample.

The above-mentioned embodiments are merely the possible implementations of the present invention, the description of which is relatively specific and detailed, but it can not therefore be interpreted as a limitation to the protection scope of the present invention. It should be pointed out that a number of modifications and improvements can also be made for a person skilled in the art without departing from the concept of the present invention, and all these modifications and improvements fall into the protection scope of the present invention.

The invention claimed is:

1. A central shaft torque sensing system for an electric bicycle comprising a central shaft, a center-mounted motor, a strain sleeve, a torque sensor, a sprocket bracket and a controller, wherein:
   one end of the strain sleeve is connected with the sprocket bracket, another end of the strain sleeve is sleeved on the central shaft and is fixedly connected with the central shaft, and the torque sensor is mounted on the strain sleeve;
   the center-mounted motor comprises a coil stator, a motor rotor, a motor output gear shaft, a planetary reduction mechanism and a dual-ratchet clutch, the motor rotor wraps around an outer side of the coil stator and is fixedly connected with the motor output gear shaft, the motor output gear shaft is sleeved on the central shaft and engages with the planetary reduction mechanism, the dual-ratchet clutch is fixedly connected with the sprocket bracket, and is connected to the strain sleeve and the planetary reduction mechanism, respectively;
   the controller is connected with the torque sensor and the center-mounted motor, respectively, and the controller controls an obtained quantity of electricity of the coil stator according to a signal detected by the sensor.

2. The central shaft torque sensing system of claim 1, wherein the motor comprises a main housing, the coil stator is fixed on the main housing, and the planetary reduction mechanism is arranged in the main housing.

3. The central shaft torque sensing system of claim 1, wherein the dual-ratchet clutch is formed by means of two ratchet wheels which have the opposite stopping directions superposing axially and is composed of an inner ring, a middle ring and an outer ring, the middle ring is fixedly connected with the sprocket bracket of the electric bicycle, the inner ring is connected with the strain sleeve, the outer ring is connected with an output end of the planetary reduction mechanism.

4. The central shaft torque sensing system of claim 3, wherein a part of the inner ring of the dual-ratchet clutch is connected with the sleeve via a first spline of which teeth and key slots present a torque travel clearance fit, and another part of the inner ring slides on the central shaft.

5. The central shaft torque sensing system of claim 3, wherein a part of the inner ring of the dual-ratchet clutch is connected with the sleeve via a first spline, another part of the inner ring is connected with the central shaft via a second spline, and teeth and key slots of the second spline present a torque travel clearance fit.

6. The central shaft torque sensing system of claim 1, wherein the motor output gear shaft engages with the planetary reduction mechanism via a gear.

7. The central shaft torque sensing system of claim 1, wherein a magnetic steel part is inserted into the rotor.

8. The central shaft torque sensing system of claim 1, wherein an inner surface of the strain sleeve fits with an outer surface of the central shaft.

9. The central shaft torque sensing system of claim 1, wherein the torque sensor connects a signal transmitter for transmitting a torsion signal to the controller.

10. The central shaft torque sensing system of claim 1, wherein the torque sensor is adhered to an outer surface of the strain sleeve.

* * * * *